US012334662B2

(12) United States Patent
Henry et al.

(10) Patent No.: US 12,334,662 B2
(45) Date of Patent: Jun. 17, 2025

(54) CARD EDGE CONNECTOR HAVING A CONNECTOR SLEEVE

(71) Applicant: TE Connectivity Solutions GmbH, Schaffhausen (CH)

(72) Inventors: Randall Robert Henry, Lebanon, PA (US); Michael John Phillips, Camp Hill, PA (US); Brandon Michael Matthews, McAlisterville, PA (US); Sandeep Patel, Littleton, CO (US); Christopher William Blackburn, Bothell, WA (US)

(73) Assignee: TE CONNECTIVITY SOLUTIONS GMBH, Schaffhausen (CH)

( * ) Notice: Subject to any disclaimer, the term of this patent is extended or adjusted under 35 U.S.C. 154(b) by 357 days.

(21) Appl. No.: 18/159,124

(22) Filed: Jan. 25, 2023

(65) Prior Publication Data

US 2024/0250460 A1 Jul. 25, 2024

(51) Int. Cl.

| | |
|---|---|
| ***H01R 12/72*** | (2011.01) |
| ***H01R 12/73*** | (2011.01) |
| ***H01R 12/89*** | (2011.01) |
| ***H01R 13/422*** | (2006.01) |
| ***H01R 13/631*** | (2006.01) |

(52) U.S. Cl.

CPC ......... *H01R 12/727* (2013.01); *H01R 12/721* (2013.01); *H01R 12/732* (2013.01); *H01R 12/89* (2013.01); *H01R 13/4226* (2013.01); *H01R 13/631* (2013.01); *H01R 2201/04* (2013.01)

(58) Field of Classification Search

CPC .. H01R 12/727; H01R 12/721; H01R 12/732; H01R 12/89; H01R 13/4226; H01R 13/631; H01R 2201/04; H01R 12/737; H01R 12/72; H01R 13/02; H01R 13/40

See application file for complete search history.

(56) References Cited

U.S. PATENT DOCUMENTS

| | | | | | |
|---|---|---|---|---|---|
| 4,560,221 | A * | 12/1985 | Olsson | H01R 12/89 | 439/373 |
| 6,238,226 | B1 * | 5/2001 | Schempp | H01R 12/87 | 439/260 |
| 6,796,822 | B2 * | 9/2004 | Sato | H01R 12/721 | 439/632 |
| 7,438,578 | B1 * | 10/2008 | Nin | H01R 12/89 | 439/260 |
| 2024/0380153 | A1 * | 11/2024 | Henry | H01R 13/502 | |

* cited by examiner

*Primary Examiner* — Travis S Chambers

(57) ABSTRACT

A card edge connector includes a connector housing having a cavity and holding a contact assembly in the cavity. The contact assembly has a contact positioner holding contacts in a contact array. Each contact includes a mating end, a terminating end, and an intermediate portion between the mating end and the terminating end. The card edge connector includes a connector sleeve coupled to the connector housing movable between a retracted position and an advanced position. The connector sleeve includes an insert received in the cavity having a card slot configured to receive a module circuit board of a pluggable module. The insert includes press anvils configured to engage the intermediate portions of the contacts to move the mating ends of the contacts toward the module circuit board to mate with corresponding contact pads on the module circuit board when moved to the advanced position.

20 Claims, 6 Drawing Sheets

CARD EDGE CONNECTOR HAVING A CONNECTOR SLEEVE

BACKGROUND OF THE INVENTION

The subject matter herein relates generally to card edge connectors of communication systems.

Some communication systems utilize communication connectors, such as card edge connectors to interconnect various components of the system for data communication. Some known communication systems use pluggable modules, such as I/O modules or circuit cards, which are electrically connected to the card edge connectors. The pluggable modules have module circuit boards having card edges that are mated with the card edge connectors during the mating operation. Each card edge connector typically has an upper row of contacts and a lower row of contact for mating with the corresponding circuit board.

Known card edge connectors are not without disadvantages. For instance, the contacts of the card edge connectors are typically curved at the mating ends to provide a large lead-in for the circuit board during mating to prevent mechanical stubbing and damage to the contacts during mating. However, such extra lengths of contacts at the ends of the contacts beyond the mating interfaces of the contacts create electrical stubs that affect the electrical performance of the card edge connectors.

A need remains for a reliable card edge connector.

BRIEF DESCRIPTION OF THE INVENTION

In one embodiment, a card edge connector for mating with a pluggable module is provided and includes a connector housing including a top and a bottom. The housing has a front and a rear. The housing has a first side and a second side. The connector housing includes a cavity extending between the front and the rear. The card edge connector includes a contact assembly received in the cavity. The contact assembly has a contact positioner holding contacts in a contact array. Each contact includes a mating end, a terminating end, and an intermediate portion between the mating end and the terminating end. The intermediate portion held by the contact positioner. The card edge connector includes a connector sleeve coupled to the connector housing. The connector sleeve movable relative to the connector housing between a retracted position and an advanced position. The connector sleeve includes an insert received in the cavity. The insert includes a card slot configured to receive a module circuit board of the pluggable module. The insert includes press anvils configured to engage the intermediate portions of the contacts. The press anvils is pressed against the intermediate portions when the connector sleeve is moved to the advanced position to move the mating ends of the contacts toward the module circuit board to mate with corresponding contact pads on the module circuit board.

In another embodiment, a card edge connector for mating with a pluggable module is provided and includes a connector housing including a top and a bottom. The housing has a front and a rear. The housing has a first side and a second side. The connector housing includes a cavity extending between the front and the rear. The card edge connector includes a contact assembly received in the cavity. The contact assembly has a contact positioner holding contacts in a contact array. The contact positioner holding ground shields between the corresponding contacts. The ground shields includes ground beams. Each contact includes a mating end, a terminating end, and an intermediate portion between the mating end and the terminating end. The intermediate portion held by the contact positioner. The card edge connector includes a connector sleeve coupled to the connector housing. The connector sleeve movable relative to the connector housing between a retracted position and an advanced position. The connector sleeve includes an insert received in the cavity. The insert includes a card slot configured to receive a module circuit board of the pluggable module. The insert includes a ground bus configured to engage the ground beams when the connector sleeve is moved to the advanced position to electrically common the ground shields. The insert includes press anvils configured to engage the intermediate portions of the contacts. The press anvils is pressed against the intermediate portions when the connector sleeve is moved to the advanced position to move the mating ends of the contacts toward the module circuit board to mate with corresponding contact pads on the module circuit board.

In a further embodiment, a communication system is provided and includes a pluggable module including a module circuit board has contact pads at a card edge. The communication system includes a card edge connector receiving the pluggable module. The card edge connector includes a connector housing holding a contact assembly and a connector sleeve. The connector sleeve is movable relative to the connector housing between a retracted position and an advanced position. The connector housing includes a top and a bottom. The housing has a front and a rear. The housing has a first side and a second side. The connector housing includes a cavity extending between the front and the rear. The contact assembly is received in the cavity. The contact assembly has a contact positioner holding contacts in a contact array. Each contact includes a mating end, a terminating end, and an intermediate portion between the mating end and the terminating end. The intermediate portion held by the contact positioner. The connector sleeve includes an insert received in the cavity. The insert includes a card slot receiving the card edge of the module circuit board. The insert includes press anvils configured to engage the intermediate portions of the contacts. The press anvils is pressed against the intermediate portions when the connector sleeve is moved to the advanced position to move the mating ends of the contacts toward the module circuit board to mate with the corresponding contact pads on the module circuit board.

DETAILED DESCRIPTION OF THE INVENTION

Figure 1:
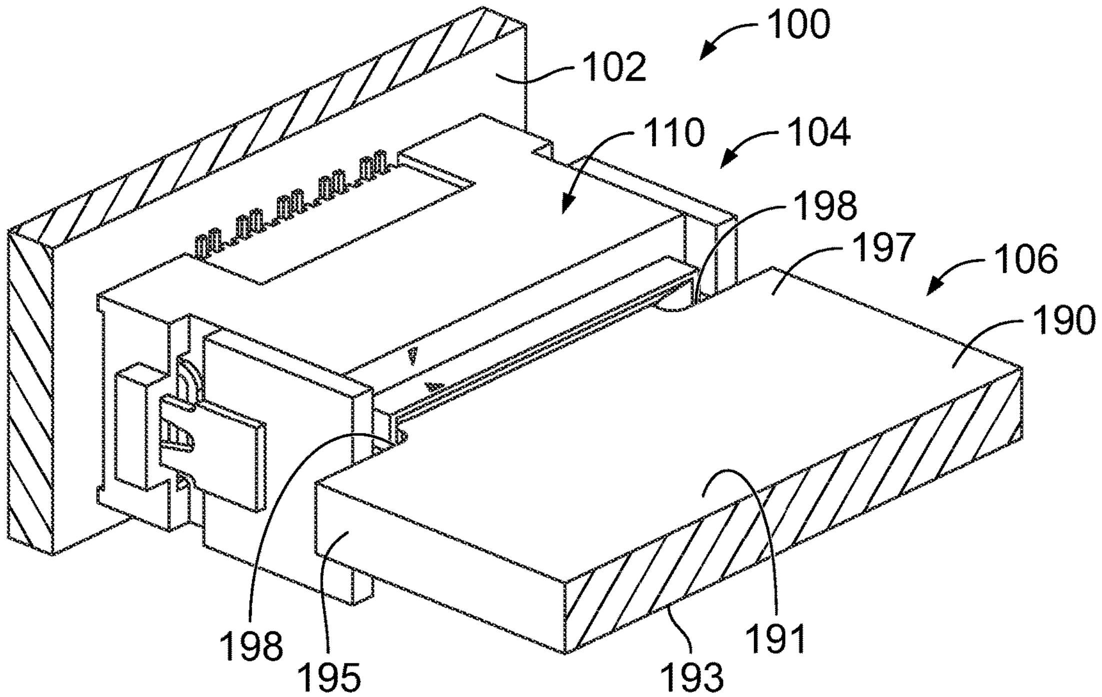
FIG. 1 is a front perspective view of a communication system formed in accordance with an exemplary embodiment including a receptacle connector assembly and a pluggable module.
Figure 2:
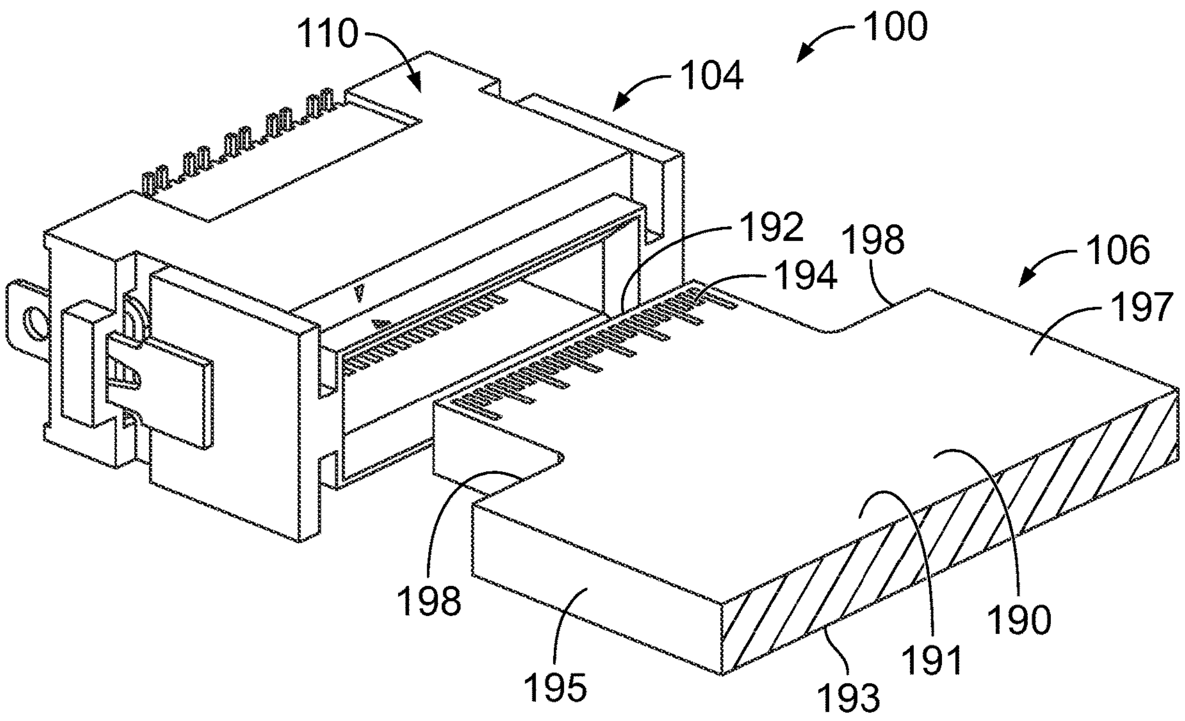
FIG. 2 is a front perspective view of the receptacle connector assembly of the communication system showing the pluggable module poised for mating with the receptacle connector assembly.

FIG. 1 is a front perspective view of a communication system 100 formed in accordance with an exemplary embodiment including a receptacle connector assembly 104 and a pluggable module 106 mated with the receptacle connector assembly 104. FIG. 2 is a front perspective view of the receptacle connector assembly 104 of the communication system 100 showing the pluggable module 106 poised for mating with the receptacle connector assembly 104 to illustrate the mating interface of the receptacle connector assembly 104. In an exemplary embodiment, the receptacle connector assembly 104 includes a card edge connector 110 configured to receive the pluggable module 106.

In an exemplary embodiment, the communication system 100 includes a host circuit board 102. The card edge connector 110 is mounted to the host circuit board 102. The pluggable module 106 is electrically connected to the host circuit board 102 through the card edge connector 110. However, in alternative embodiments, the card edge connector 110 may be terminated to ends of cables (not shown) rather than the host circuit board 102.

In the illustrated embodiment, the communication system 100 is arranged with the host circuit board 102 oriented perpendicular to the pluggable module 106 and the mating direction of the pluggable module 106 with the card edge connector 110. For example, the host circuit board 102 is oriented vertically and the pluggable module 106 oriented horizontally. Other orientations are possible in alternative embodiments. In the illustrated embodiment, the card edge connector 110 is a straight or pass-through connector with the mating end opposite the terminating end or mounting end. However, in alternative embodiments, the card edge connector 110 may be a right-angle connector with the mating end oriented perpendicular to the terminating/mounting end.

The pluggable module 106 includes a module circuit board 190 having a card edge 192 configured to be plugged into the card edge connector 110. The module circuit board 190 includes an upper surface 191 and a lower surface 193 with the card edge 192 between the surfaces 191, 193. The module circuit board 190 includes contact pads 194 at the card edge 192, such as on both the upper surface 191 and the lower surface 193. The contact pads 194 may be connected to traces, vias or other circuit components of the module circuit board 190.

In an exemplary embodiment, the pluggable module 106 includes a plug portion 196 and wings 195, 197 on opposite sides of the plug portion 196. The plug portion 196 is configured to be plugged into the card edge connector 110. The wings 195, 197 are located outside of the card edge connector 110. In an exemplary embodiment, the wings 195, 197 include module press surfaces 198. The module press surfaces 198 are configured to press against the card edge connector 110 during mating.

The pluggable module 106 may include other elements in alternative embodiments, such as a plug housing or plug body that holds and surrounds at least a portion of the module circuit board 190. For example, the module circuit board 190 may be located within a cavity of the plug body and present at the mating end of the plug body for mating with the card edge connector 110. The pluggable module 106 may include a latch or other structure to secure the pluggable module 106 to the card edge connector 110.

The receptacle connector assembly 104 may include other elements in alternative embodiments, such as a receptacle cage that surrounds the card edge connector 110 and that receives the pluggable module 106. The receptacle cage may provide shielding for the card edge connector 110 and the pluggable module 106. The pluggable module 106 may be coupled to the receptacle cage, such as being latchably coupled to the receptacle cage. The receptacle cage may include an elongated channel that receives the pluggable module 106. The receptacle cage may be a shell that surrounds at least a portion of the card edge connector 110.

Figure 3:
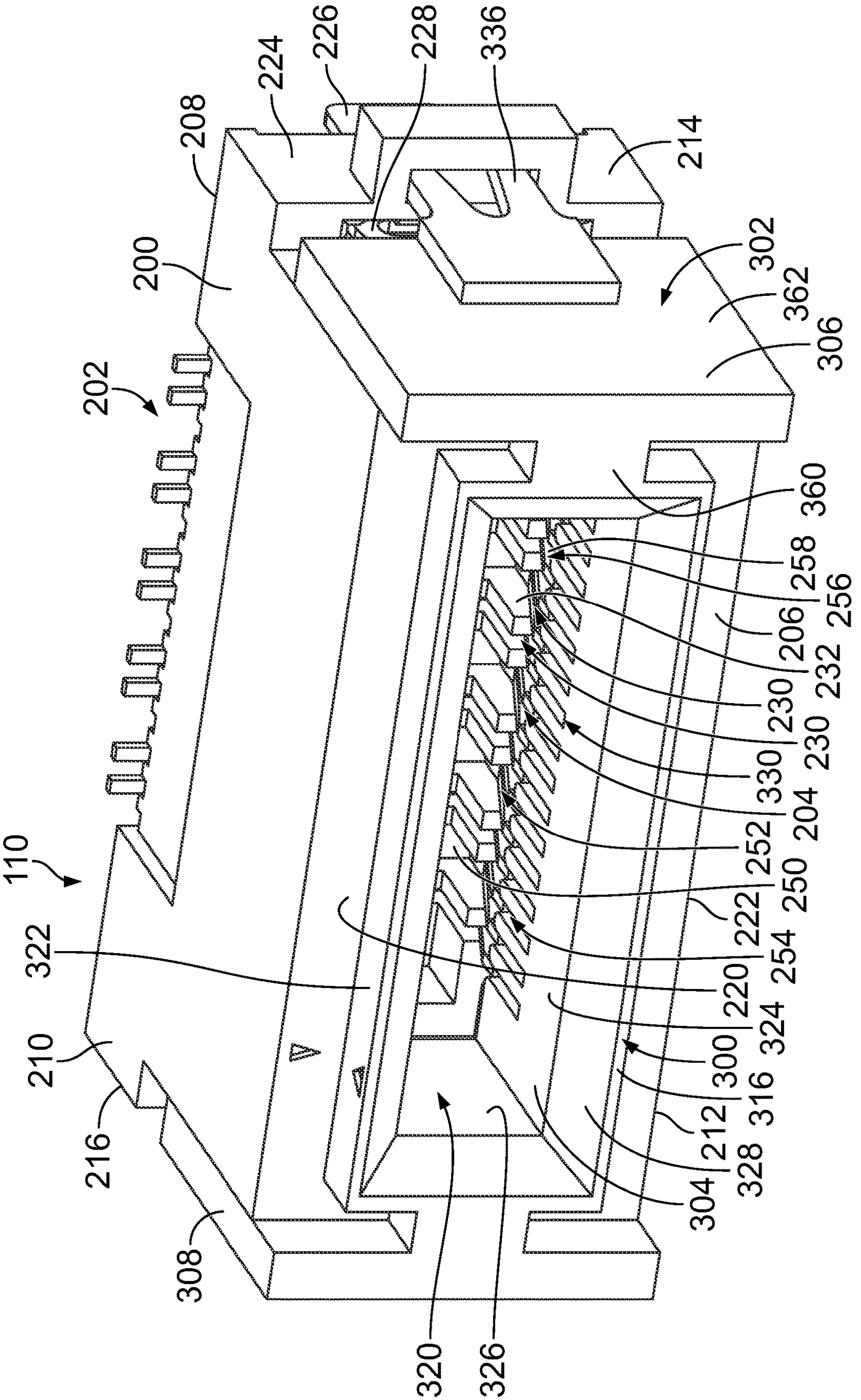
FIG. 3 is a front perspective view of a card edge connector of the receptacle connector assembly in accordance with an exemplary embodiment.

FIG. 3 is a front perspective view of the card edge connector 110 in accordance with an exemplary embodiment. The card edge connector 110 includes a connector housing 200, a contact assembly 202, and a connector sleeve 300. The contact assembly 202 is received in a cavity 204 of the connector housing 200. The connector sleeve 300 is coupled to the connector housing 200 and is movable relative to the connector housing 200 between a retracted position (FIG. 3) and an advanced position. In an exemplary embodiment, the module circuit board 190 of the pluggable module 106 (shown in FIG. 2) is configured to interface with the connector sleeve 300 during plugging into the card edge connector 110 to actuate and move the connector sleeve 300 relative to the connector housing 200 from the retracted position to the advanced position. The connector sleeve 300 interfaces with the contact assembly to mate the contact assembly 202 with the module circuit board 190.

The connector housing 200 extends between a front 206 and a rear 208. The connector housing 200 extends between a top 210 and a bottom 212. The connector housing 200 extends between opposite sides 214, 216. The connector housing 200 may be generally box shaped in various embodiments. In the illustrated embodiment, the rear 208 defines a mounting end configured to be mounted to the host circuit board 102 (shown in FIG. 1) and the front 206 defines the mating end configured to be mated with the pluggable module 106 (shown in FIG. 1). Other orientations are possible in alternative embodiments.

The connector housing 200 includes a top wall 220 at the top 210 and a bottom wall 222 at the bottom 212. The cavity 204 is defined between the top wall 220 and the bottom wall 222. The cavity 204 is open at the front 206 to receive the connector sleeve 300 and the module circuit board 190. In an exemplary embodiment, the cavity 204 is open at the rear 208 to receive the contact assembly 202. However, the cavity 204 may be open at the bottom to receive the contact assembly 202, such as when the card edge connector 110 is a right-angle connector.

In an exemplary embodiment, the connector housing 200 includes mounting brackets 224 for mounting the card edge connector 110 to the host circuit board 102. The mounting brackets 224 may be located at the sides 214, 216, such as at the rear 208 of the connector housing 200. Other locations are possible in alternative embodiments.

In an exemplary embodiment, connector mounts 226 are coupled to the mounting bracket 224. The connector mounts 226 are used to mount the card edge connector 110 to the host circuit board 102. In the illustrated embodiment, the connector mounts 226 include solder tabs configured to be soldered to the host circuit board 102. Other types of connector mounts 226 may be used in alternative embodiments, such as threaded fasteners, clips, or other mounting features.

In an exemplary embodiment, biasing elements 228 are coupled between the connector housing 200 and the connector sleeve 300. The biasing elements 228 hold the connector sleeve 300 in the retracted position. The biasing elements 228 forward bias the connector sleeve 300 relative to the connector housing 200. The forward bias of the biasing elements 228 may be overcome to allow the connector sleeve 300 to move in a rearward advancing/actuation direction from the retracted position to the advanced position. In various embodiments, the biasing elements 228 are mechanically Springs connected between the connector housing 200 and the connector sleeve 300. The biasing elements 228 may be connected to the mounting brackets 224. In various embodiments, the biasing elements 228 are integral with the connector mounts 226, such as being stamped and formed with the connector mounts 226.

In an exemplary embodiment, the connector housing 200 includes contact channels 230 within the cavity 204. The contact channels 230 are configured to receive contacts of the contact assembly 202. The connector housing 200 may include locating tabs 232 for locating the contacts of the contact assembly 202. For example, the locating tabs 232 may locate the contacts for termination to the host circuit board 102, such as to align the contacts with corresponding contact pads on the host circuit board 102. In the illustrated embodiment, the locating tabs 232 are located at the rear 208 of the connector housing 200.

The contact assembly 202 includes a contact positioner 250 holding contacts 252 arranged in a contact array 254. Optionally, the contacts 252 may be arranged in an upper array and a lower array to mate with opposite sides of the module circuit board 190. The contacts 252 are located in corresponding contact channels 230. In various embodiments, the contacts 252 are arranged in pairs configured to convey differential signals. In an exemplary embodiment, the contact assembly 202 includes a shield structure 256 providing shielding between corresponding contacts 252. For example, the shield structure 256 may be located between the pairs of the contacts 252. The shield structure 256 may be located between the upper and lower contact arrays. In an exemplary embodiment, the shield structure 256 includes ground beams 258 configured to be connected to the module circuit board 190. The ground beams 258 may be received in corresponding contact channels 230.

Figure 4:
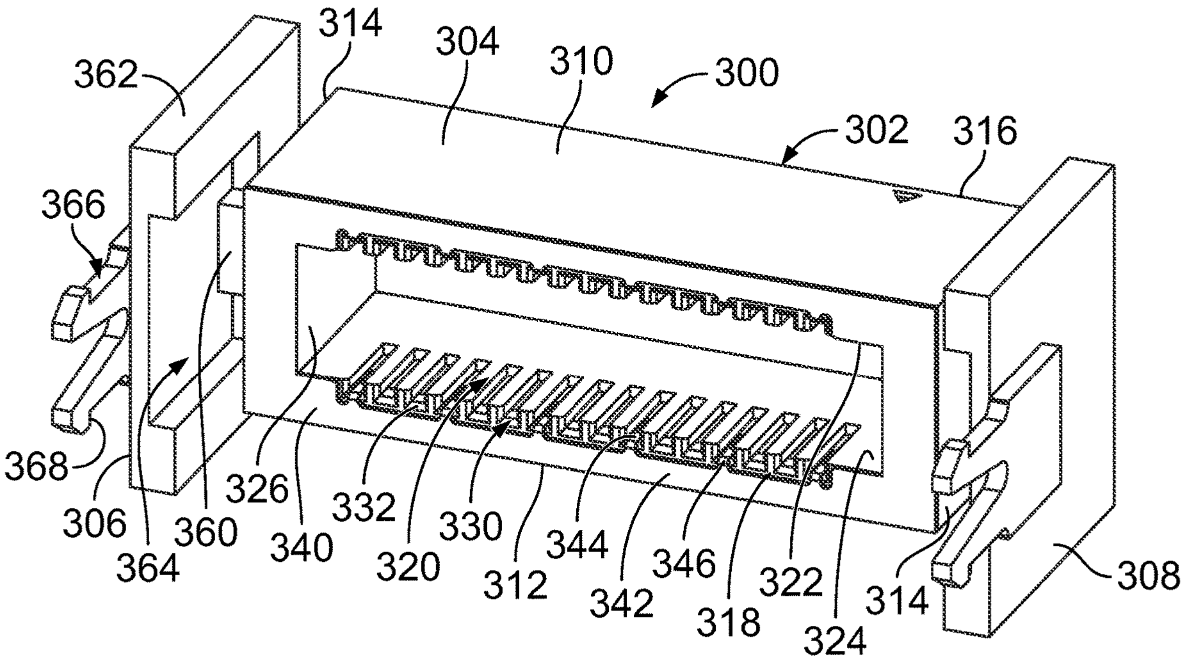
FIG. 4 is a rear perspective view of a connector sleeve of the card edge connector in accordance with an exemplary embodiment.

With additional reference to FIG. 4, which is a rear perspective view of the connector sleeve 300, the connector sleeve 300 is separate and discrete from the connector housing 200. The connector sleeve 300 is configured be received in the cavity 204 of the connector housing 200. The connector sleeve 300 is configured to interface with the pluggable module 106 during mating of the pluggable module 106 with the card edge connector 110. The connector sleeve 300 is configured to interface with the contact assembly 202, such as to locate the contacts of the contact assembly 202.

The connector sleeve 300 is manufactured from a dielectric material, such as a plastic material. The connector sleeve 300 may be a molded part. The connector sleeve 300 includes a main body 302 having an insert 304 and mounting arms 306, 308 at opposite sides of the main body 302. The insert 304 is configured to be plugged into the cavity 204 of the connector housing 200. The mounting arms 306, 308 are configured to couple the connector sleeve 300 to the connector housing 200. In an exemplary embodiment, the mounting arms 306, 308 are located exterior of the connector housing 200, such as along the sides 214, 216.

The insert 304 may be generally box shaped in various embodiments. The insert 304 is sized and shaped to fit in the front end of the cavity 204 of the connector housing 200. The insert 304 extends between a top 310 and a bottom 312. The insert 304 includes opposite sides 314 between the top 310 and the bottom 312. The insert 304 extends between a front 316 and a rear 318. In an exemplary embodiment, the insert 304 defines a card slot 320 configured to receive the module circuit board 190. The walls of the insert 304 surrounds the card slot 320, such as along the top 310, the bottom 312, and the sides 314. For example, the card slot 320 is defined between an upper wall 322 at the top 310, a lower wall 324 at the bottom 312, and side walls 326 at the sides 314. The card slot 320 is open at the front 316 and the rear 318. In an exemplary embodiment, the insert 304 includes lead-in surfaces 328 at the front 316 to guide the module circuit board 190 into the card slot 320. The height of the card slot 320 (between the upper and lower walls 322, 324) may be approximately equal to a thickness of the module circuit board 190 to vertically position the module circuit board 190 in the card slot 320. The width of the card slot 320 (between the side walls 326) may be approximately equal to the width of the plug portion of the module circuit board 190 to horizontally position the module circuit board 190 in the card slot 320.

In an exemplary embodiment, the insert 304 includes contact slots 330 in the upper wall and the lower wall of the insert 304. The contact slots 330 are located at the rear 318 and extend towards the front 316. In the illustrated embodiment, the contact slots 330 extend partially between the rear 318 in the front 316. In alternative embodiments, the contact slots 330 may extend the entire length of the insert 304 between the rear 318 in the front 316. The contact slots 330 are configured to receive corresponding contacts 252 of the contact assembly 202. The contact slot 330 position the contacts 252 relative to the insert 304 (for example, side to side). In an exemplary embodiment, the ground beams 258 are received in corresponding contact slots 330 to position the ground beams 258 relative to the contacts 252. In an exemplary embodiment, the contact slots 330 have a depth approximately equal to a thickness of the contacts 252; however, the contact slots 330 may have a depth greater than a thickness of the contacts 252 or less than the thickness of the contacts 252 in alternative embodiments. Optionally, the contact slots 330 may have a variable depth, such as greater at the rear 318 and the narrowing as the contact slots 330 extend forward.

In an exemplary embodiment, the insert 304 includes press anvils 332 configured to engage the contacts 252 and press the contacts 252 inward to mate the contacts 252 with the module circuit board 190. In an exemplary embodiment, the press anvils 332 are located at the rear 318. The press anvils 332 are provided at the corner or transition between the rear 318 and the card slot 320. For example, the press anvils 332 may be provided at the corner or transition between the rear 318 and the corresponding contact slots

330. The press anvils 332 are shaped to interface with the contacts 252. The press anvils 332 may have curved pressing surfaces. The press anvils 332 may be rearward facing. The press anvils 332 may face the card slot 320. The press anvils 332 are configured to be pressed into the contacts 252 when the connector sleeve 300 is plugged into the connector housing 200, such as during mating with the module circuit board 190.

In an exemplary embodiment, the connector sleeve 300 includes a ground bus 340 configured to electrically connect to the shield structure 256. For example, the ground bus 340 may be electrically connected to each of the ground beams 258. In an exemplary embodiment, the ground bus 340 is a separate metal structure coupled to the insert 304 of the connector sleeve 300. However, in alternative embodiments, the ground bus 340 may be formed directly on the insert 304. For example, the ground bus 340 may be a plating or coating layer formed at discrete locations along the insert 304. In an exemplary embodiment, the ground bus 340 includes a main bus 342 along the rear 318 and bus fingers 344 extending from the main bus 342 into corresponding contact slots 330. The bus fingers 344 are configured to be located in the contact slots 330 that receive the ground beams 258. The bus fingers 344 are configured to be electrically connected to the ground beams 258 to electrically common each of the ground beams 258. In an exemplary embodiment, the ground bus 340 includes press anvils 346 configured to press against the ground beams 258 to deflect the ground beams 258 when the connector sleeve 300 is plugged into the connector housing 200.

The mounting arms 306, 308 flank opposite sides of the insert 304. Each mounting arm 306, 308 includes a connecting portion 360 and a flanking portion 362 extending from the connecting portion 360. The connecting portion 360 connects the mounting arm 306, 308 to the insert 304. The flanking portion 362 extends along the exterior side of the connector housing 200.

The mounting arm 306, 308 includes a pocket 364 along the interior surface of the flanking portion 362. The pocket 364 is configured to receive the biasing element 228, such as the spring, extending between the connector housing 200 and the connector sleeve 300.

The mounting arm includes a mounting clip 366 extending from the rear of the flanking portion 362. The mounting clip 366 is used to couple the connector sleeve 300 to the connector housing 200. For example, the mounting clip 366 may be received in an opening in the mounting bracket 224 of the connector housing 200. The mounting clip 366 is latched or clipped to the mounting bracket 224 to prevent removal of the connector sleeve 300 from the connector housing 200. For example, the mounting clip 366 may include one or more latches 368 configured to be latched onto the mounting bracket 224 to prevent forward removal of the connector sleeve 300 from the connector housing 200. The latches 368 engage the mounting bracket 224 to hold the connector sleeve 300 in the retracted position (FIG. 3). The mounting clip 366 may slide within the opening of the mounting bracket 224 as the connector sleeve 300 is moved rearwardly from the retracted position to the advanced position, such as when the module circuit board 190 is plugged into the card edge connector 110. Other types of securing features may be used in alternative embodiments to secure the connector sleeve 300 to the connector housing 200.

Figure 5:
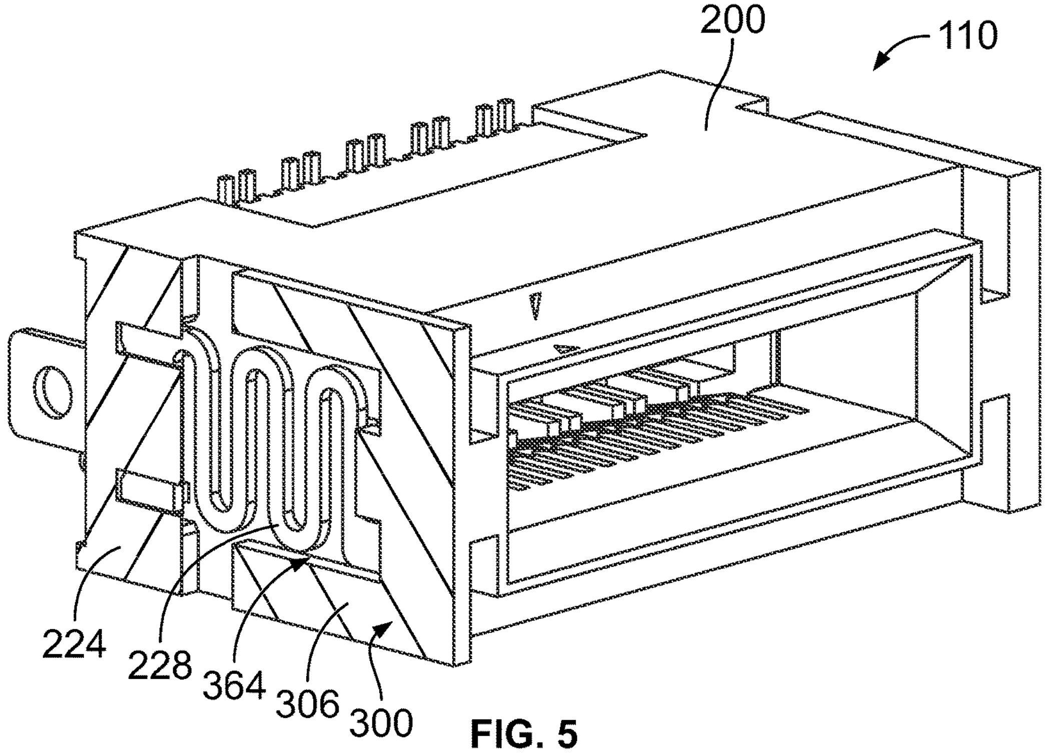
FIG. 5 is a front perspective, partial sectional view of the card edge connector in accordance with an exemplary embodiment.

FIG. 5 is a front perspective, partial sectional view of the card edge connector 110 in accordance with an exemplary embodiment. FIG. 5 illustrates the biasing element 228 extending between the connector housing 200 and the connector sleeve 300. The biasing element 228 is received in the pocket 364 of the mounting arm 306. The biasing element 228 extends into the mounting bracket 224 of the connector housing 200.

In the illustrated embodiment, the biasing element 228 is a snake spring having multiple spring elements. Other types of biasing members may be used in alternative embodiments, such as a coil spring, a leaf springs, a phone gasket, or other type of biasing member.

Figure 6:
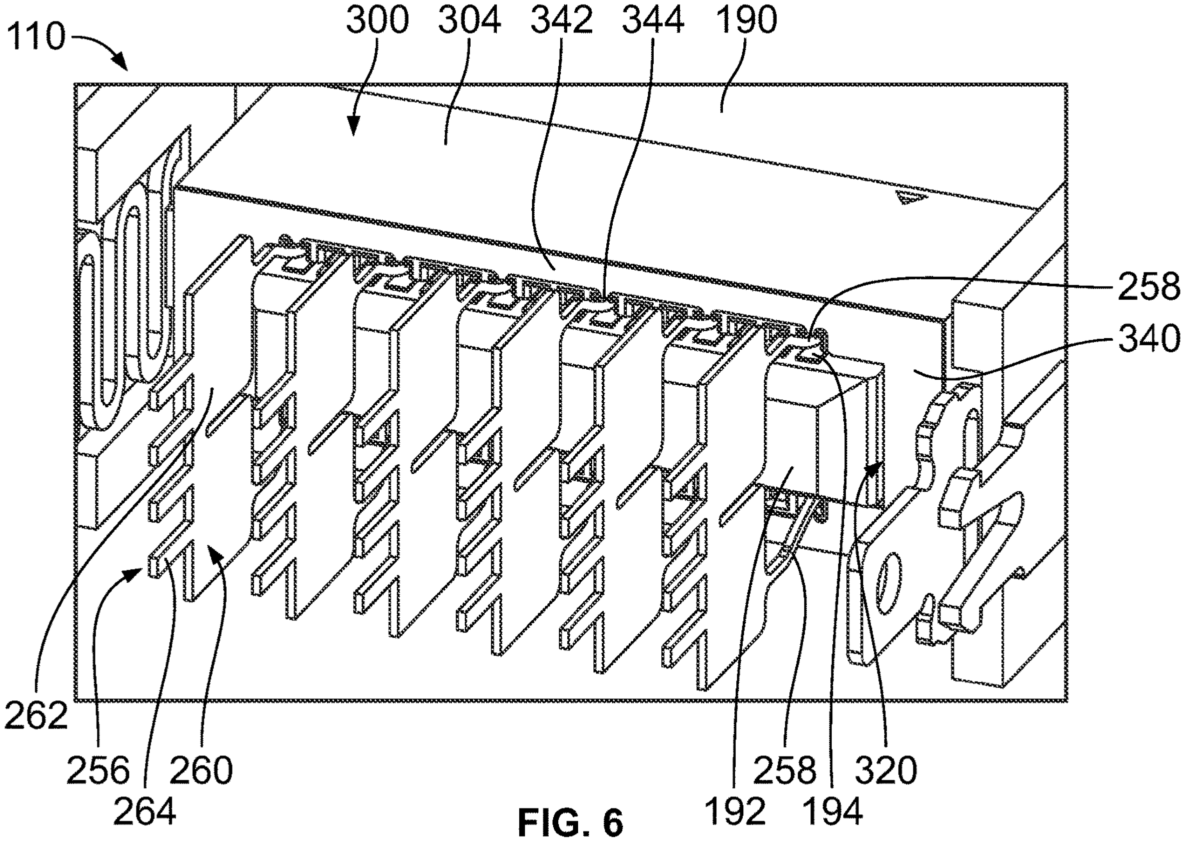
FIG. 6 is a rear perspective view of a portion of the card edge connector in accordance with an exemplary embodiment.

FIG. 6 is a rear perspective view of a portion of the card edge connector 110 in accordance with an exemplary embodiment showing the module circuit board 190 plugged into the mating ends of the card edge connector 110. Portions of the card edge connector 110 are removed to illustrate the internal components of the card edge connector 110. For example, the connector housing 200 (FIG. 3) and the contact assembly 202 (FIG. 3) are removed to illustrate the shield structure 256 and the connector sleeve 300.

During mating, the plug end of the module circuit board 190 is plugged into the card slot 320 of the connector sleeve 300. The card edge 192 of the module circuit board 190 is located in the card slot 320 between the upper wall and the lower wall of the insert 304 to position the contact pads 194 for mating with the contacts 252 (not shown). The contact pads 194 are also positioned to mate with the ground beams 258 of the shield structure 256. The ground bus 340 is used to electrically common each of the ground beams 258. For example, the bus fingers 344 may engage the ground beams 258 to electrically connect to each of the ground beams 258 and the main bus 342 may electrically common each of the bus fingers 344, and thus the ground beams 258.

In an exemplary embodiment, the shield structure 256 includes a plurality of ground shields 260. Each ground shield 260 includes a ground plate 262 and at least one of the ground beams 258. In the illustrated embodiment, each ground shield 260 includes a pair of the ground beams 258, such as an upper ground beam and a lower ground beam. The ground plates 262 are configured to provide electrical shielding between corresponding contacts 252 of the contact assembly 202, such as between pairs of the contacts 252. In an exemplary embodiment, each ground plate 262 includes a plurality of pins 264 configured to be electrically connected to the host circuit board 102. For example, the pins 264 may be solder pins or press-fit pins configured to be electrically connected to the host circuit board 102. In various embodiments, the pins 264 may be eye-of-the-needle pins.

Figure 7:
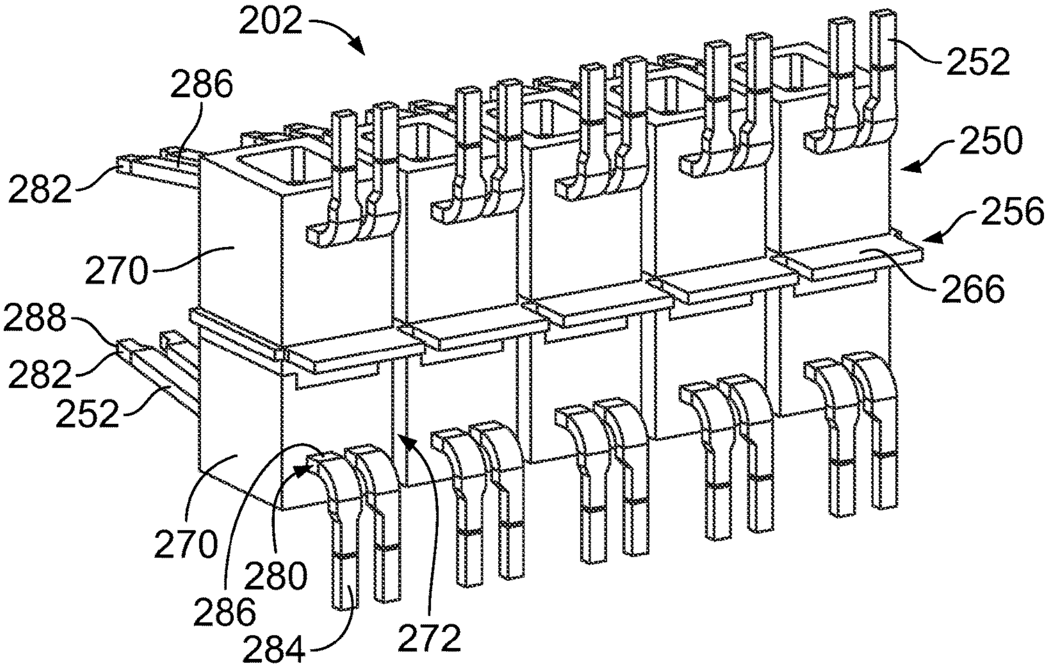
FIG. 7 is a rear perspective view of the contact assembly of the card edge connector in accordance with an exemplary embodiment.

FIG. 7 is a rear perspective view of the contact assembly 202 of the card edge connector 110 in accordance with an exemplary embodiment. The contact assembly 202 includes the contact positioner 250 and the contacts 252. The contact positioner 250 includes one or more contact holders 270 that hold the corresponding contacts 252. The contact holders 270 may be overmolded over the contacts 252. In an exemplary embodiment, each contact holder 270 holds a pair of the contacts 252. However, in alternative embodiments, the contact positioner 250 may include a single contact holder 270 holding all of the contacts 252, or a pair of contact holders, such as an upper contact holder holding all of the upper contacts and a lower contact holder holding all of the lower contacts.

In an exemplary embodiment, the contact holders 270 are separated by gaps 272, which are configured to receive the ground plates 262 (shown in FIG. 6) to provide shielding between the pairs of the contacts 252. In an exemplary embodiment, the shield structure 256 includes a connecting plate 266 that connects each of the contact holders 270. The connecting plate 266 may be a stamped and formed part. The ground plate 262 may be electrically connected to the connecting plate 266. As such, the connecting plate 266 electrically commons each of the ground plates 262. In various embodiments, the contact holders 270 may be formed in place on the connecting plate 266. For example, the contact holders 270 may be molded in situ on the connecting plate 266. Optionally, the upper contact holders may be molded to the connecting plate 266 and the lower contact holders may be coupled to the corresponding upper contact holders, or vice versa.

In an exemplary embodiment, the contacts 252 may be stamped and formed contacts stamped from a lead frame. The contacts 252 may be arranged in one or more rows, such as an upper row of upper contacts and a lower row of lower contacts. The upper contacts and the lower contacts may be identical, however may be oriented differently within the contact assembly 202.

Each contact 252 includes a contact body 280 having a mating end 282, a terminating end 284, and an intermediate portion 286 between the mating end 282 and the terminating end 284. The intermediate portion 286 is held by the contact holder 270 of the contact positioner 250. For example, the intermediate portion 286 may be overmolded by the contact holder 270. The intermediate portion 286 may extend rearward of the contact holder 270 to the terminating end 284 and/or forward of the contact holder 270 to the mating end 282. In an exemplary embodiment, the intermediate portion 286 is angled inward (for example, toward a center plane of the contact assembly 202) from the contact holder 270 to the mating end 282. For example, the intermediate portion 286 of the upper contact is tapered downward whereas the intermediate portion 286 of the lower contact is tapered upward.

The terminating end 284 is configured to be terminated to the host circuit board 102 or a conductor of the corresponding cable. For example, the terminating end 284 may include a solder pad configured to be soldered to the host circuit board 102 or the conductor of the corresponding cable. In alternative embodiments, the terminating end 284 may include a compliant pin configured to be press-fit into the host circuit board 102. In the illustrated embodiment, the terminating end 284 is bent approximately 90° relative to the intermediate portion 286 such that a surface of the contact 252 at the terminating end 284 is configured to be soldered to the host circuit board 102. Such surfaces may be co-planer within the contact array.

The mating end 282 is provided at a distal tip 288 of the contact 252. The mating end 282 defines a mating interface for the contact 252 with the module circuit board 190. In an exemplary embodiment, the mating end 282 is generally flat and may be oriented parallel to the mating direction with the module circuit board 190. For example, the mating end 282 may be oriented generally horizontally. The mating end 282 of the upper contact may be generally parallel to the mating end 282 of the lower contact across a gap that receives the module circuit board 190. In an exemplary embodiment, the mating end 282 does not include a mechanical stub (for example, lead-in hook or tail) that is flared outward, as is typical of spring beam contacts. Rather, the mating end 282 ends abruptly at the mating interface. For example, the mating interface is provided at the distal tip of the contact 252. As such, the contacts 252 do not include electrical stubs beyond the mating interfaces. The stub-less mating end 282 has improved electrical performance compared to contacts having the outwardly flared mechanical stub. For example, the stub-less mating end 282 has improved return loss and reduced crosstalk problems compared to contacts having mechanical lead-in stubs.

Figure 8:
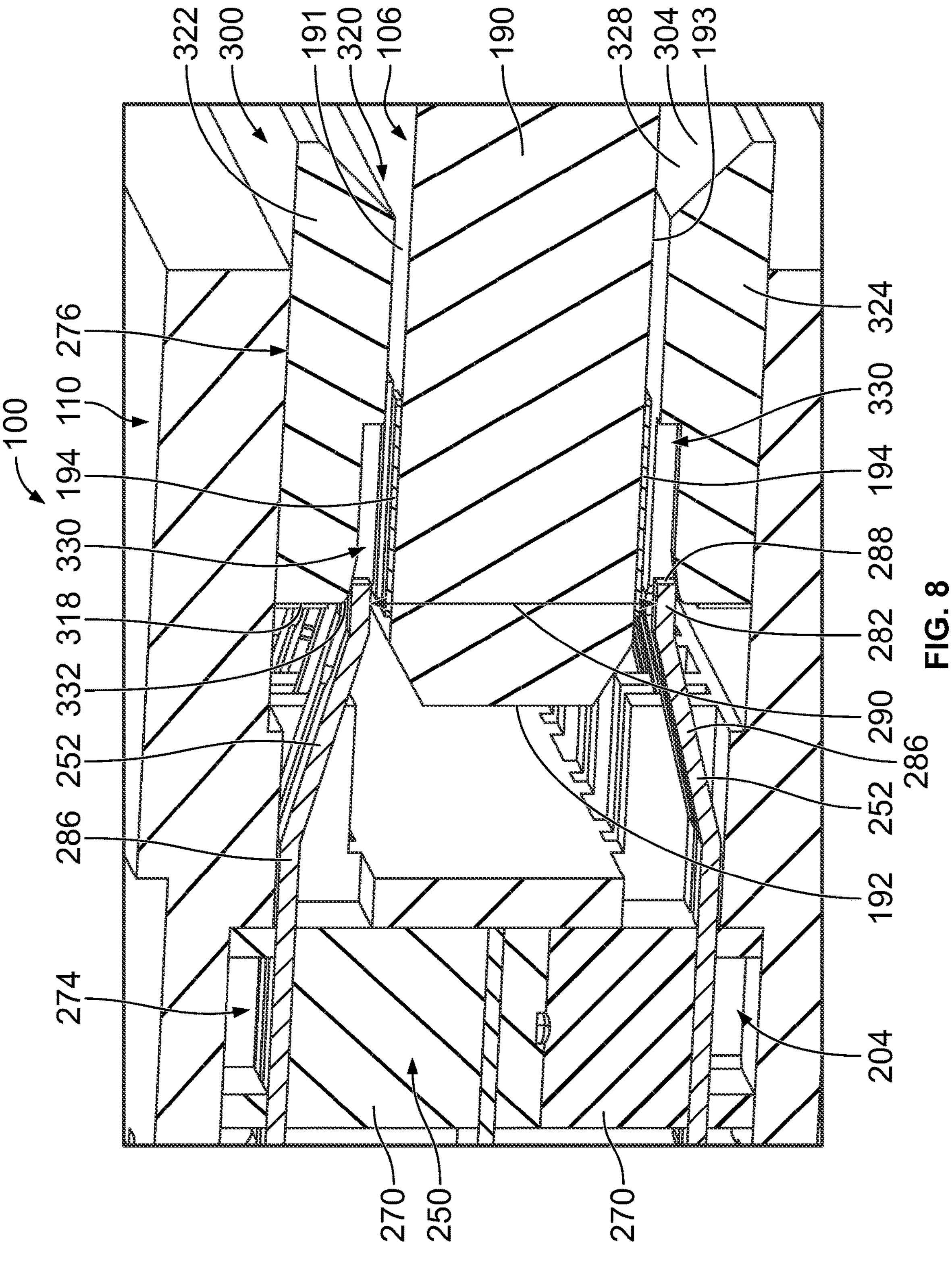
FIG. 8 is a cross sectional view of a portion of the communication system in accordance with an exemplary embodiment showing the module circuit board partially mated with the card edge connector.
Figure 9:
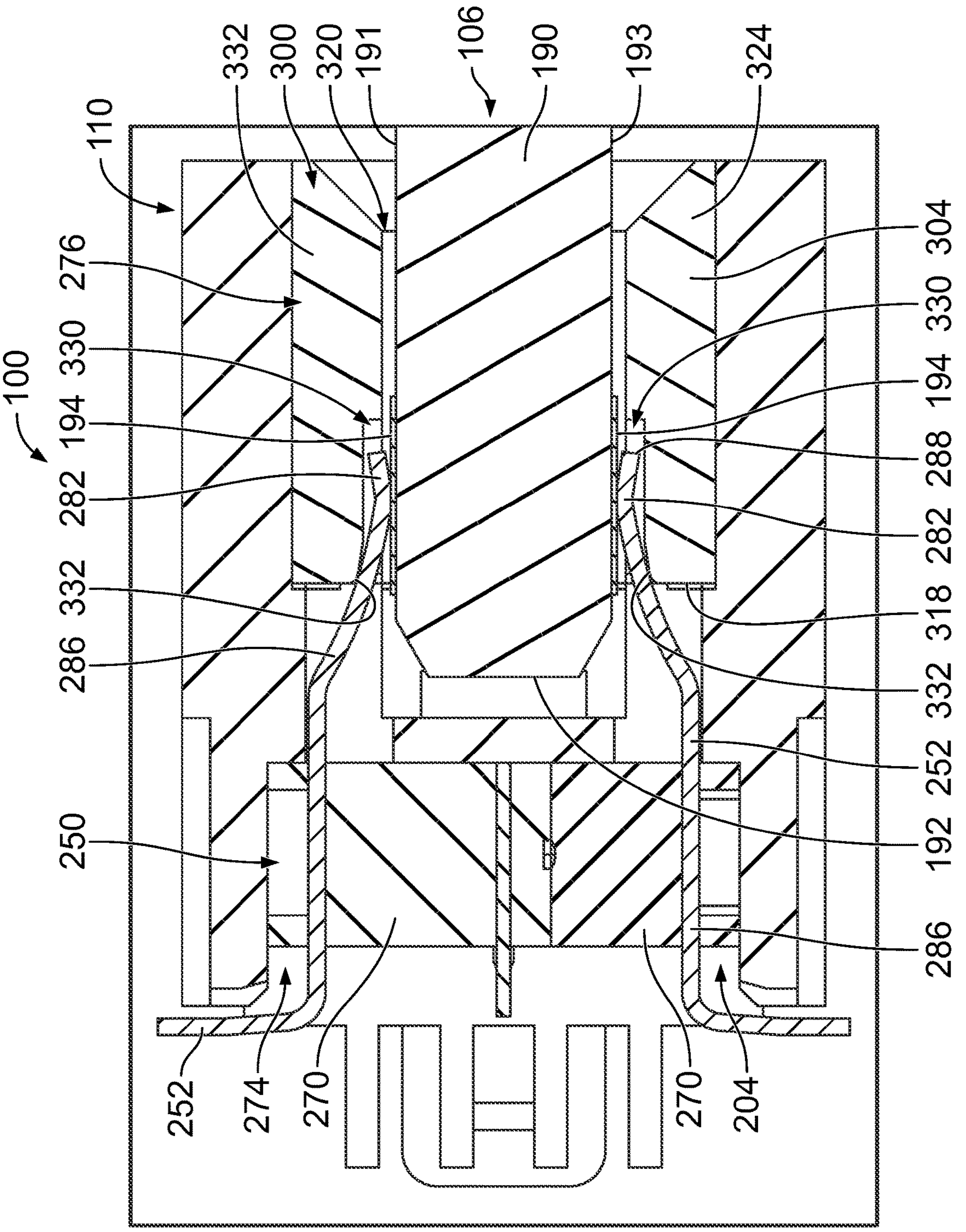
FIG. 9 is a cross sectional view of a portion of the communication system in accordance with an exemplary embodiment showing the module circuit board fully mated with the card edge connector.

FIG. 8 is a cross sectional view of a portion of the communication system 100 in accordance with an exemplary embodiment, showing the module circuit board 190 partially mated with the card edge connector 110. FIG. 9 is a cross sectional view of a portion of the communication system 100 in accordance with an exemplary embodiment, showing the module circuit board 190 fully mated with the card edge connector 110.

During mating, the module circuit board 190 of the pluggable module 106 is plugged into the card slot 320 of the connector sleeve 300 at the mating end of the card edge connector 110. The module circuit board 190 is located between the upper wall 322 and the lower wall 324 of the connector sleeve 300 and may be guided into the card slot 320 by the lead-in surfaces 328 at the upper and lower walls 322, 324. The height of the card slot 320 (between the upper and lower walls 322, 324) may be approximately equal to a thickness of the module circuit board 190 to vertically position the module circuit board 190 in the card slot 320.

When assembled, the contact holders 270 are located in a rear portion 274 of the cavity 204 and the contacts 252 extend forward of the contact holders 270 into a front portion 276 of the cavity 204. The insert 304 is received in the front portion 276 of the cavity 204 and is movable within the cavity 204 between the retracted position (FIG. 8) and the advanced position (FIG. 9). The contacts 252 are located in the front portion 276 of the cavity 204 for mating with the insert 304 and the module circuit board 190. For example, the upper contacts 252 are located above the card slot 320 and the lower contacts 252 are located below the card slot 320. In the retracted position, the insert 304 may be initially positioned forward of the mating ends 282 of the contacts 252. However, in various embodiments, the distal tips 288 of the contacts 252 may be located in the corresponding contact slots 330 to hold the distal tips 288 relative to each other (for example, to control the side-to-side positioning of the contacts 252). The mating ends 282 of the contacts 252 are initially spaced apart by a distance 290. The distance 290 is greater than the thickness of the module circuit board 190. The distance 290 may be greater than the height of the card slot 320 and the contact slots 330 may have lead-ins to gather the mating ends 282 and move the mating ends 282 inward into the contact slots 330 and close the distance 290. Because the mating ends 282 are spaced far enough apart to receive the card edge 192 of the module circuit board 190, the mating ends 282 do not include a mechanical stub (for example, lead-in hook or tail) that is flared outward, as is typical of spring beam contacts. Rather, the mating ends 282 are flat and parallel to each other for mating directly to the module circuit board 190 at the distal tips 288, thus eliminating electrical stub forward of the mating interfaces of the contacts 252.

During mating, the connector sleeve 300 is movable from the retracted position (FIG. 8) to the advanced position (FIG. 9). The connector sleeve 300 is moved rearwardly in an advancing direction. For example, the connector sleeve 300 is moved toward the contact positioner 250 as the connector sleeve 300 is moved from the retracted position to the advanced position. The press anvils 332 at the rear 318 of the insert 304 are pressed into the contacts 252 to press the contacts 252 into mechanical and electrical connection with the module circuit board 190. When the connector sleeve 300 is advanced, the mating ends 282 slide into the contact slots 330. The press anvils 332 engage the intermediate portions 286 of the contacts 252. The press anvils 332 press against the intermediate portions 286 to move the mating ends 282 toward the module circuit board 190 to mate with the corresponding contact pads 194 on the module circuit board 190. In an exemplary embodiment, the intermediate portions 286 extend forward of the contact positioner 250 to the mating ends 282. The intermediate portions are cantilevered from the contact holders 270 and are flexible and movable within the cavity 204. For example, the intermediate portions 286 are pivotable about the contact holders 270. The press anvils 332 press against the intermediate portions 286 to pivot the intermediate portions 286 at the contact positioner 250 to move the mating ends 282 toward the module circuit board 190.

In an exemplary embodiment, the mating ends 282 are arranged generally horizontally in the contact slots 330. The upper and lower mating ends 282 extend generally parallel to each other and are oriented generally parallel to the module circuit board 190. When the insert 304 is moved in the rearward actuation direction from the retracted position to the advanced position, the mating ends 282 are moved in an inward mating direction by the press anvils 332. For example, the mating ends 282 of the upper contacts are moved inward in a generally downward direction whereas the mating ends 282 of the lower contacts are moved inward in a generally upward direction. The mating direction is generally perpendicular to the rearward actuation direction. The press anvils 332 move the mating ends 282 of the upper contacts and the lower contacts inward towards each other to engage the upper surface 191 and the lower surface 193 of the module circuit board 190, respectively.

The mating ends 282 are moved out of the contact slots 330 when the press anvils 332 interface with the intermediate portions 286. For example, the inner surfaces of the mating ends 282 are moved inwardly, out of the contact slots 330, to engage the mating ends 282 with the module circuit board 190. The mating interfaces at the distal tips 288 of the contacts 252 are mated with the contact pads 194 in the mating direction. When the mating ends 282 are pressed against the module circuit board 190 by the press anvils 332, the contacts have a load or spring force holding the mating interfaces in mechanical and electrical contact with the contact pads 194 of the module circuit board 190.

In an exemplary the mating ends 282 are movable from a clearance position (FIG. 8) to a mated position (FIG. 9). The mating ends 282 are positioned clear of the module circuit board 190 in the card slot 320 in the clearance position to allow the module circuit board 190 to plug into the card slot 320 without interfering with or damaging the contacts 252. When the contacts 252 are pressed inward to the mated position, the mating ends 282 engage the module circuit board 190 to electrically connect to the contact pads 194. The contacts 252 are designed to be stub-less and do not include an electrical stub forward of the mating interface with the module circuit board 190.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A card edge connector for mating with a pluggable module comprising:

a connector housing including a top and a bottom, the housing having a front and a rear, the housing having a first side and a second side, the connector housing including a cavity extending between the front and the rear;

a contact assembly received in the cavity, the contact assembly having a contact positioner holding contacts in a contact array, each contact including a mating end, a terminating end, and an intermediate portion between the mating end and the terminating end, the intermediate portion held by the contact positioner; and a connector sleeve coupled to the connector housing, the connector sleeve movable relative to the connector housing between a retracted position and an advanced position, the connector sleeve including an insert received in the cavity, the insert including a card slot configured to receive a module circuit board of the pluggable module, the insert including press anvils configured to engage the intermediate portions of the contacts, the press anvils being pressed against the intermediate portions when the connector sleeve is moved to the advanced position to move the mating ends of the contacts toward the module circuit board to mate with corresponding contact pads on the module circuit board.

2. The card edge connector of claim 1, wherein the mating ends extend parallel to the module circuit board.

3. The card edge connector of claim 1, wherein the insert is moved in a rearward actuation direction from the retracted position to the advanced position, the mating ends being moved in an inward mating direction by the press anvils generally perpendicular to the rearward actuation direction.

4. The card edge connector of claim 1, wherein the mating ends include mating interfaces at distal tips of the contacts.

5. The card edge connector of claim 1, wherein the intermediate portions extend forward of the contact positioner to the mating ends, the press anvils pressing against the intermediate portions to pivot the intermediate portions at the contact positioner to move the mating ends toward the module circuit board.

6. The card edge connector of claim 1, wherein the mating ends are movable from a clearance position to a mated position, the mating ends positioned clear of the module circuit board in the card slot in the clearance position, the mating ends engaging the module circuit board in the mated position.

7. The card edge connector of claim 1, wherein the connector sleeve is movable toward the contact positioner as the connector sleeve is moved from the retracted position to the advanced position.

8. The card edge connector of claim 1, wherein the connector sleeve includes contact slots receiving the mating ends of the contacts, the mating ends being moved out of the contact slots when the press anvils interface with the intermediate portions to engage the mating ends with the module circuit board.

9. The card edge connector of claim 1, wherein the contacts include upper contacts and lower contacts, the upper contacts located above the card slot, the lower contacts located below the card slot, the press anvils moving the mating ends of the upper contacts and the lower contacts inward towards each other to engage an upper surface and a lower surface of the module circuit board, respectively.

10. The card edge connector of claim 1, wherein the insert includes an upper wall and a lower wall, the card slot defined between the upper wall and the lower wall, the contacts being received in contact slots in the upper wall, the press anvils pressing the intermediate portions to move the mating ends downward out of the contact slots to engage the module circuit board.

11. The card edge connector of claim 1, further comprising a return spring between the connector housing and the connector sleeve returning the connector sleeve from the advanced position to the retracted position.

12. The card edge connector of claim 1, wherein the connector sleeve includes a press surface, the press surface configured to engage the module circuit board when the module circuit board is plugged into the card slot to drive the connector sleeve from the retracted position to the advanced position as the module circuit board is plugged into the card slot.

13. The card edge connector of claim 1, wherein the terminating ends of the contacts are configured to be terminated to one of a host circuit board or conductors of cables.

14. The card edge connector of claim 1, wherein the cable assembly further comprises ground shields between the corresponding contacts, the ground shields including ground beams extending into the card slot, the press anvils configured to engage the ground beams when the connector sleeve is moved to the advanced position to move the ground beams toward the module circuit board to mate with corresponding ground pads on the module circuit board.

15. The card edge connector of claim 14, wherein the insert includes a ground bus configured to engage the ground beams when the connector sleeve is moved to the advanced position to electrically common the ground shields.

16. A card edge connector for mating with a pluggable module comprising:

a connector housing including a top and a bottom, the housing having a front and a rear, the housing having a first side and a second side, the connector housing including a cavity extending between the front and the rear;

a contact assembly received in the cavity, the contact assembly having a contact positioner holding contacts in a contact array, the contact positioner holding ground shields between the corresponding contacts, the ground shields including ground beams, each contact including a mating end, a terminating end, and an intermediate portion between the mating end and the terminating end, the intermediate portion held by the contact positioner; and a connector sleeve coupled to the connector housing, the connector sleeve movable relative to the connector housing between a retracted position and an advanced position, the connector sleeve including an insert received in the cavity, the insert including a card slot configured to receive a module circuit board of the pluggable module, the insert including a ground bus configured to engage the ground beams when the connector sleeve is moved to the advanced position to electrically common the ground shields, the insert including press anvils configured to engage the intermediate portions of the contacts, the press anvils being pressed against the intermediate portions when the connector sleeve is moved to the advanced position to move the mating ends of the contacts toward the module circuit board to mate with corresponding contact pads on the module circuit board.

17. The card edge connector of claim 16, wherein the ground bus includes ground fingers extending along corresponding press anvils, the ground fingers being electrically connected to the ground beams.

18. A communication system comprising:

a pluggable module including a module circuit board having contact pads at a card edge; and a card edge connector receiving the pluggable module, the card edge connector including a connector housing holding a contact assembly and a connector sleeve, the connector sleeve being movable relative to the connector housing between a retracted position and an advanced position, the connector housing including a top and a bottom, the housing having a front and a rear, the housing having a first side and a second side, the connector housing including a cavity extending between the front and the rear, the contact assembly being received in the cavity, the contact assembly having a contact positioner holding contacts in a contact array, each contact including a mating end, a terminating end, and an intermediate portion between the mating end and the terminating end, the intermediate portion held by the contact positioner, the connector sleeve including an insert received in the cavity, the insert including a card slot receiving the card edge of the module circuit board, the insert including press anvils configured to engage the intermediate portions of the contacts, the press anvils being pressed against the intermediate portions when the connector sleeve is moved to the advanced position to move the mating ends of the contacts toward the module circuit board to mate with the corresponding contact pads on the module circuit board.

19. The communication system of claim 18, wherein the pluggable module includes a module press surface, the connector sleeve including a press surface, the module press surface engaging the module press surface when the module circuit board is plugged into the card slot to drive the connector sleeve from the retracted position to the advanced position as the module circuit board is plugged into the card slot.

20. The communication system of claim 18, further comprising a host circuit board, the terminating ends of the contacts being terminated to the host circuit board.

* * * * *